(12) United States Patent
Sjovall et al.

(10) Patent No.: US 7,246,610 B2
(45) Date of Patent: Jul. 24, 2007

(54) CYLINDER HEAD

(75) Inventors: Scott A. Sjovall, Westby, WI (US); Eric Orvis Wangen, Viola, WI (US); Nathan L. Oium, La Farge, WI (US); Jeffrey John Bailey, Richland Center, WI (US)

(73) Assignee: S & S Cycle, Inc., Viola, WI (US)

( * ) Notice: Subject to any disclaimer, the term of this patent is extended or adjusted under 35 U.S.C. 154(b) by 196 days.

(21) Appl. No.: 10/680,890

(22) Filed: Oct. 7, 2003

(65) Prior Publication Data

US 2005/0178371 A1   Aug. 18, 2005

(51) Int. Cl.
  *F02M 25/06* (2006.01)
  *F02F 1/24* (2006.01)

(52) U.S. Cl. ............................. 123/572; 123/193.5 F; 123/2

(58) Field of Classification Search ............... None
  See application file for complete search history.

(56) References Cited

U.S. PATENT DOCUMENTS

| | | |
|---|---|---|
| 2,314,059 A | 3/1943 | Steiner |
| 3,038,459 A | 6/1962 | Schmid |
| 3,048,156 A | 8/1962 | Slooten |
| 3,195,527 A | 7/1965 | Eaton |
| 3,428,296 A | 2/1969 | Erickson |
| 3,612,016 A | 10/1971 | Jelen |
| 3,830,209 A | 8/1974 | Jones, Jr. et al. |
| 4,126,318 A | 11/1978 | Belter |
| 4,135,478 A | 1/1979 | Rassey |
| 4,364,340 A | 12/1982 | Kimura |
| D277,756 S | 2/1985 | Davidson |
| 4,509,473 A | 4/1985 | Hamparian |
| RE31,877 E | 5/1985 | Nomura |
| 4,515,346 A | 5/1985 | Gaterman, III |
| D279,294 S | 6/1985 | Davidson |

(Continued)

FOREIGN PATENT DOCUMENTS

EP   0 251 159 A2 *  1/1988

(Continued)

OTHER PUBLICATIONS

S&S Cycle Catalog No. 13, Cylinder Head Kits, pp. 4-3 through 4-23, Feb. 2002.

(Continued)

*Primary Examiner*—Stephen K. Cronin
*Assistant Examiner*—Arnold Castro
(74) *Attorney, Agent, or Firm*—Steptoe & Johnson LLP

(57) ABSTRACT

An internal combustion engine includes a cylinder head and rocker box assembly that includes a duct arrangement that removes blow-by gases. In a first embodiment, a duct is formed from the upper surface of the cylinder head aligned with an opening in the bottom of the rocker box and proceeds to horizontal sections leading to a fitting with a line leading to an intake manifold. In a second embodiment, a single straight duct includes a straight angled portion extending downward at an oblique angle to the upper surface of the cylinder head to an intake port in the cylinder head. Action of the engine draws the unwanted gases from the rocker box through the opening of the ducts to an intake of the engine.

10 Claims, 10 Drawing Sheets

U.S. PATENT DOCUMENTS

| | | | |
|---|---|---|---|
| D280,200 S | 8/1985 | Iwakura et al. | |
| D283,995 S | 5/1986 | Kohama et al. | |
| 4,592,311 A | 6/1986 | Makino | |
| 4,602,607 A | * 7/1986 | Balsley | 123/574 |
| 4,653,726 A | 3/1987 | Lang et al. | |
| D294,264 S | 2/1988 | Davidson et al. | |
| 4,783,087 A | 11/1988 | DeCore et al. | |
| 4,862,839 A | 9/1989 | Bridges | |
| 4,989,556 A | 2/1991 | Shiina et al. | |
| 5,072,697 A | 12/1991 | Sputhe | |
| 5,105,777 A | 4/1992 | Kronich et al. | |
| 5,143,351 A | 9/1992 | Pierce | |
| 5,205,244 A | 4/1993 | Nakamura et al. | |
| 5,251,583 A | 10/1993 | Shiohara | |
| 5,255,640 A | 10/1993 | Pierce | |
| 5,301,767 A | 4/1994 | Shiohara | |
| 5,310,198 A | 5/1994 | Belter | |
| 5,322,039 A | 6/1994 | Kinsey | |
| 5,394,843 A | 3/1995 | Decuir | |
| 5,421,292 A | 6/1995 | Hoffman et al. | |
| 5,492,085 A | 2/1996 | Tiller et al. | |
| 5,560,446 A | 10/1996 | Onishi | |
| 5,577,570 A | 11/1996 | Shiohara et al. | |
| 5,603,515 A | 2/1997 | Bock | |
| 5,605,342 A | 2/1997 | Genin et al. | |
| 5,673,661 A | 10/1997 | Jesel | |
| 5,908,079 A | 6/1999 | Amino | |
| 5,983,849 A | 11/1999 | Wangen et al. | |
| 6,065,457 A | * 5/2000 | Hoffmann et al. | 123/572 |
| D432,546 S | 10/2000 | Savage et al. | |
| D434,047 S | 11/2000 | Ballentine | |
| D436,112 S | 1/2001 | Savage et al. | |
| D437,572 S | 2/2001 | Rodriguez | |
| 6,209,502 B1 | 4/2001 | Davis et al. | |
| D449,620 S | 10/2001 | Feuling | |
| 6,296,071 B1 | 10/2001 | Runte et al. | |
| 6,345,613 B1 | 2/2002 | Hoffmann et al. | |
| D463,451 S | 9/2002 | Wangen | |
| D463,801 S | 10/2002 | Kinsey et al. | |
| D463,802 S | 10/2002 | Sjovall et al. | |
| D466,133 S | 11/2002 | Kinsey et al. | |
| D467,940 S | 12/2002 | Kinsey et al. | |
| 6,510,823 B2 | 1/2003 | Hirano et al. | |
| 6,691,661 B2 | 2/2004 | Lundgreen et al. | |
| D521,025 S | 5/2006 | Egland et al. | |
| D522,022 S | 5/2006 | Carlin et al. | |
| 7,059,210 B2 | 6/2006 | Thiessen et al. | |

FOREIGN PATENT DOCUMENTS

| | | |
|---|---|---|
| GB | 621557 | 4/1949 |
| WO | 99/66229 A3 | 12/1999 |

OTHER PUBLICATIONS

RevTech. TM. Cylinder Heads, Custom Chrome Catalog, p. 312 (1994).

RevTech. TM. Cylinder Heads for Evolution. RTM. Motors Without Component Parts, Custom Chrome Catalog, p. 314 (1994).

* cited by examiner

CYLINDER HEAD

BACKGROUND OF THE INVENTION

1. Field of the Invention

The present invention relates to an engine having a cylinder head and rocker box with a relief duct system that redirects and reduces gases flowing past the piston and engine.

2. Description of the Prior Art

Internal combustion engines produce gases in the combustion chamber that are forced under pressure past the piston and into the engine's crankcase. Such gases are typically an oil-laden mist and are often referred to as "blow-by" gas. The piston motion causes pressure fluctuations in the crankcase forcing the blow-by gases to be routed back toward the engine carburetor. Such leakage leads to accumulations of oil in the combustion chamber and elsewhere and may interfere with engine operation. Such blow-by may also lead to a buildup on the air filter and a decrease in engine performance. The air filter, seals and other components may have to be replaced after a much shorter interval due to blow-by.

To overcome this problem, systems have been developed that provide for a breather system such as shown in U.S. Pat. No. 6,345,613. That breather system utilizes an open channel formed in the upper surface of the cylinder head. The channel allows for breathing and for the oil mist laden air to flow through the channel and other passages. However, the system shown in U.S. Pat. No. 6,345,613 requires formation of several connecting passages and an arcing channel that must be formed in the upper surface of the cylinder head in a complicated machining operation. Such a system has proven to be difficult to machine and the formation of a long channel may weaken the cylinder head. The system in U.S. Pat. No. 6,345,613 also relies on passive breathing to atmosphere, rather being drawn by a vacuum to remove the blow-by gases.

It can be appreciated that a blow-by removal system is needed that overcomes the problems associated with the prior art. Such a system should provide for simple manufacture and positive removal of the blow-by gases. Such a system should provide for improved removal efficiencies while maintaining the structural integrity of the cylinder head and avoiding difficult to manufacture channels. The present invention addresses these as well as other problems associated with removal of blow-by gases in internal combustion engines.

SUMMARY OF THE INVENTION

The present invention is directed to a cylinder assembly and in particular, to a cylinder head having a duct system for removing blow-by that seeps to unwanted engine locations. The engine generally includes a crankcase connected to a transmission while holding lubricating oil. The engine crankshaft and one or more camshafts are also retained. For motorcycle engines, a typical embodiment includes a V-shaped arrangement with cylinder assemblies extending from the upper end of the crankcase. Each of the cylinder assemblies generally includes a cylinder, a cylinder head and a rocker box. A piston extends upward within the cylinder and reciprocates back and forth, driving the crankshaft. Pushrods generally extend outside of the cylinder and connect the crankcase to rocker arms in the rocker box. It can be appreciated that other engine configurations may also utilize the present invention.

The cylinder head generally includes an upper mounting surface that engages the under side of the rocker box. The cylinder head also includes structure for receiving engine valves as well as intake and exhaust ports that attach to respective manifolds. The cylinder head further defines a combustion chamber that is aligned with the top of the opening to the cylinder. A spark plug is received in the cylinder head to provide spark to the combustion chamber for ignition. Cooling fins may extend from various locations on the cylinder head to provide increased surface area for improved air cooling. The cylinder head also typically includes openings or recesses for the push rods, as well as mounting holes for bolting to both the rocker box and the cylinder.

In a first embodiment of a duct system for removing blow-by, a duct extends from the upper surface of the cylinder head downward along a vertical bore. The vertical bore portion intersects a horizontal portion that connects to another horizontal portion receiving a fitting extending out to the side of the cylinder head. The fitting generally receives a fluid relief line that connects to an intake assembly, typically the intake manifold mounting to the intake port at the side of the cylinder head. The end of the horizontal portion that intersects the vertical bore may receive a plug or is otherwise filled to close the duct and provide flow only to the fitting. The vertical bore portion of the duct is aligned with an opening in the rocker box. The action of the engine while operating provides suction to draw air and blow-by gases from the rocker box through the opening in the rocker box aligned with the duct in the cylinder head. The blow-by gases are sucked into the vertical portion and passing through the two intersecting horizontal portions through the fitting, out the blow-by relief line and to the intake manifold.

In a second embodiment, the cylinder head includes a duct system with a single straight duct portion formed through the cylinder head extending from the upper mounting surface of the cylinder head to the intake system, and in particular to the intake port. The duct generally extends at an oblique angle to the upper surface and acts as a straight tube leading to the intake port. Blow-by gases are drawn in a similar manner to the first embodiment through the rocker box to vertical bores through the bottom of the rocker box that is aligned with the angled duct. The blow-by gases are drawn through the duct to the intake port.

It will be appreciated to those skilled in the art that other duct arrangements from the upper surface of the cylinder head to a portion of the intake system may be possible that provide removal of unwanted gases and are within the scope of the present invention. Moreover, it can be appreciated that the particular embodiment that is utilized would depend upon the mounting arrangement and the application for the cylinder head. It can also be appreciated that within the same engine, the two embodiments may be mixed and matched, depending upon the engine use and mounting requirements.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
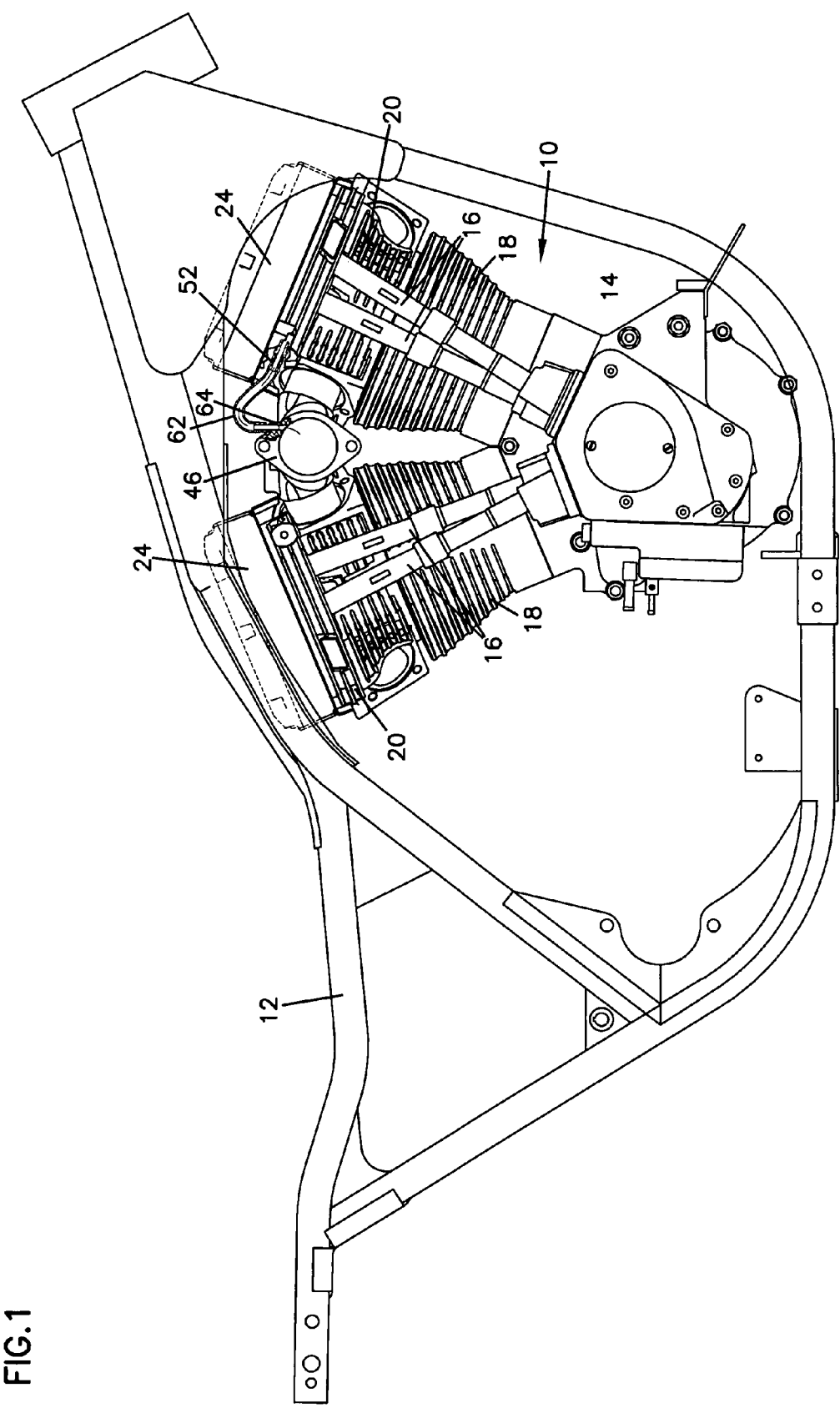
FIG. 1 is a side elevational view of a first embodiment of a motorcycle frame and engine according to the principles of the present invention with a line leading from the blow-by duct to the intake manifold.
Figure 2:
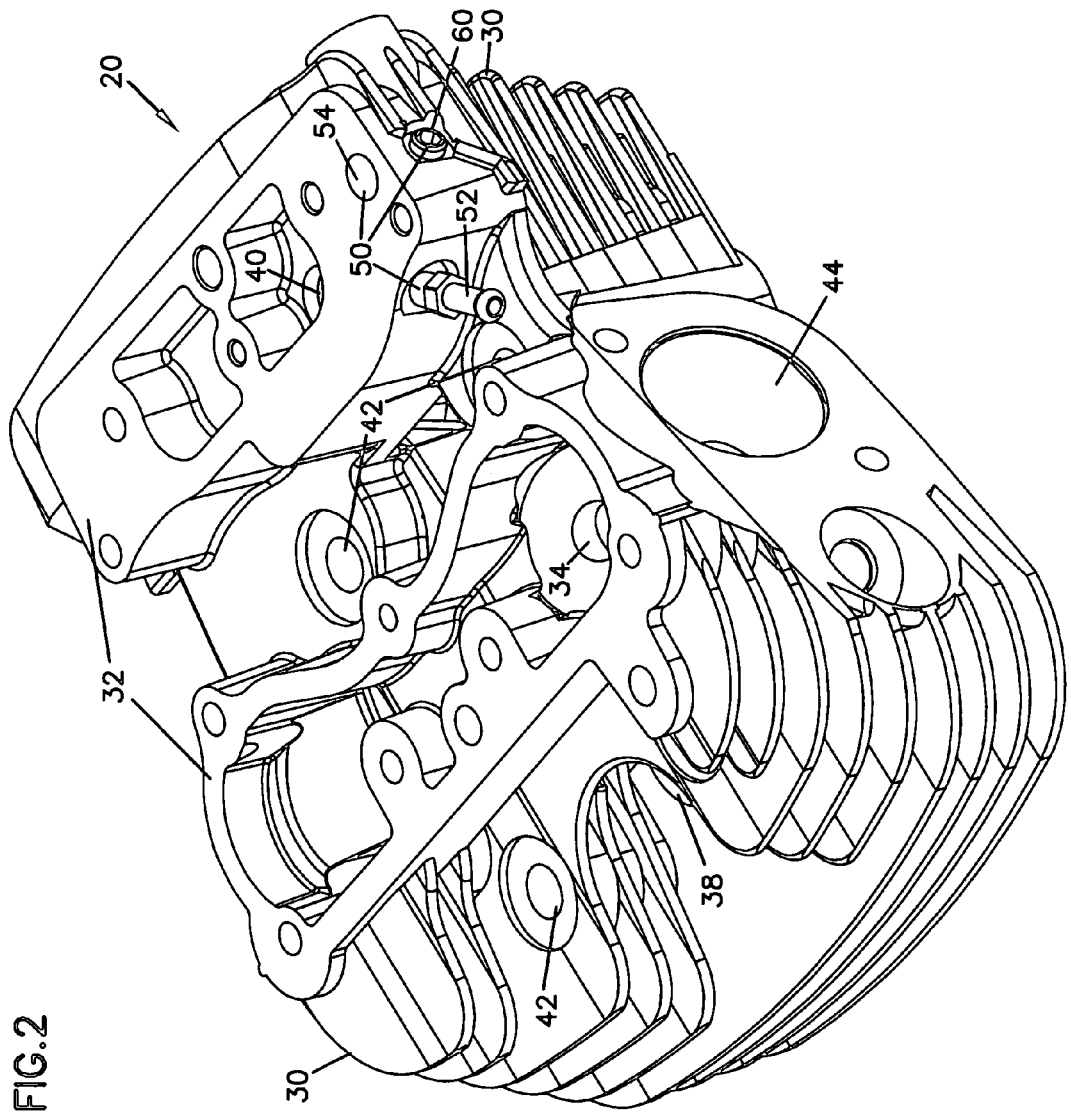
FIG. 2 is a perspective view of a first embodiment of a cylinder head for the engine shown in FIG. 1.
Figure 6:
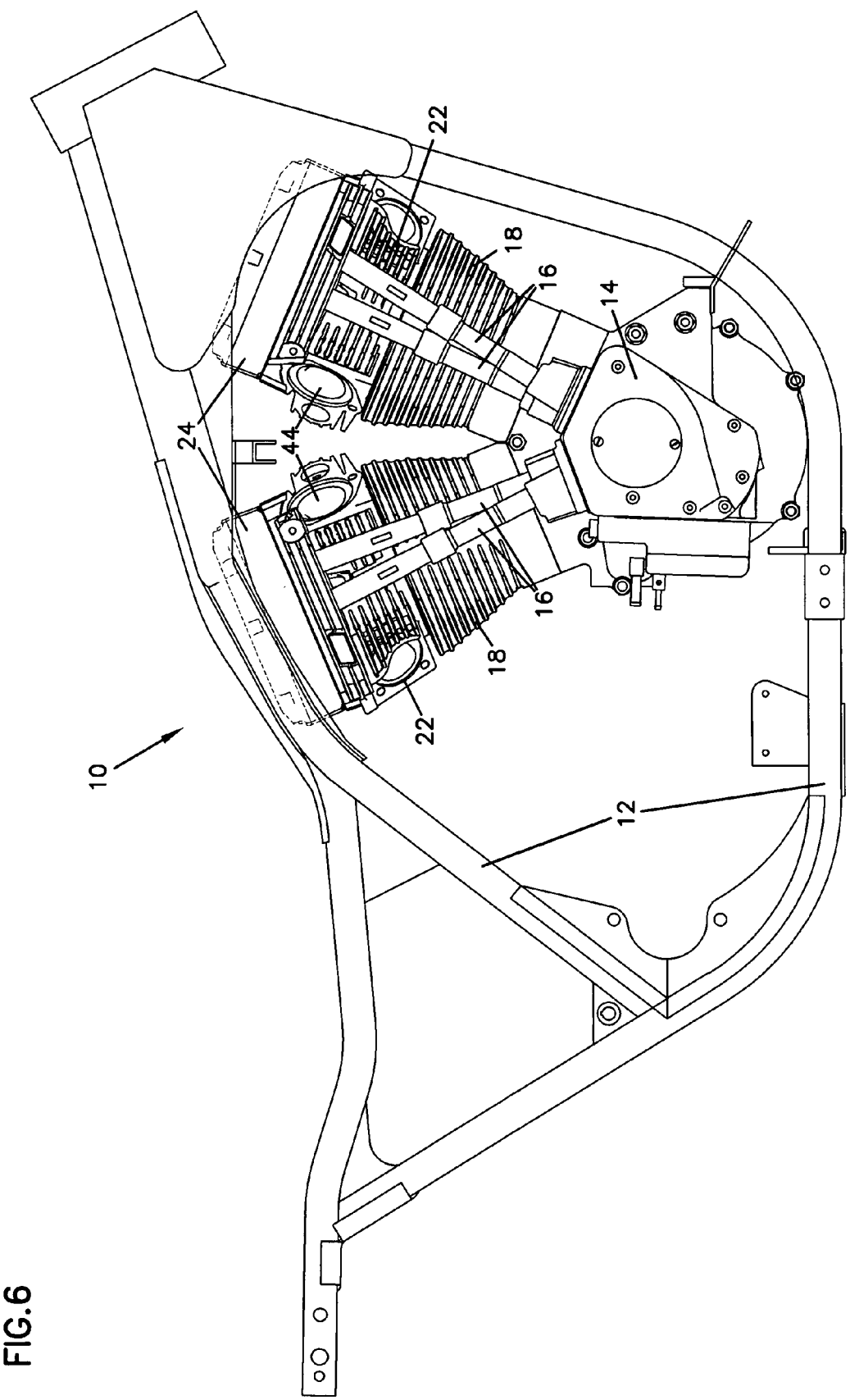
FIG. 6 is a side elevational view of a second embodiment of a motorcycle engine and frame according to the principles of the present invention.
Figure 7:
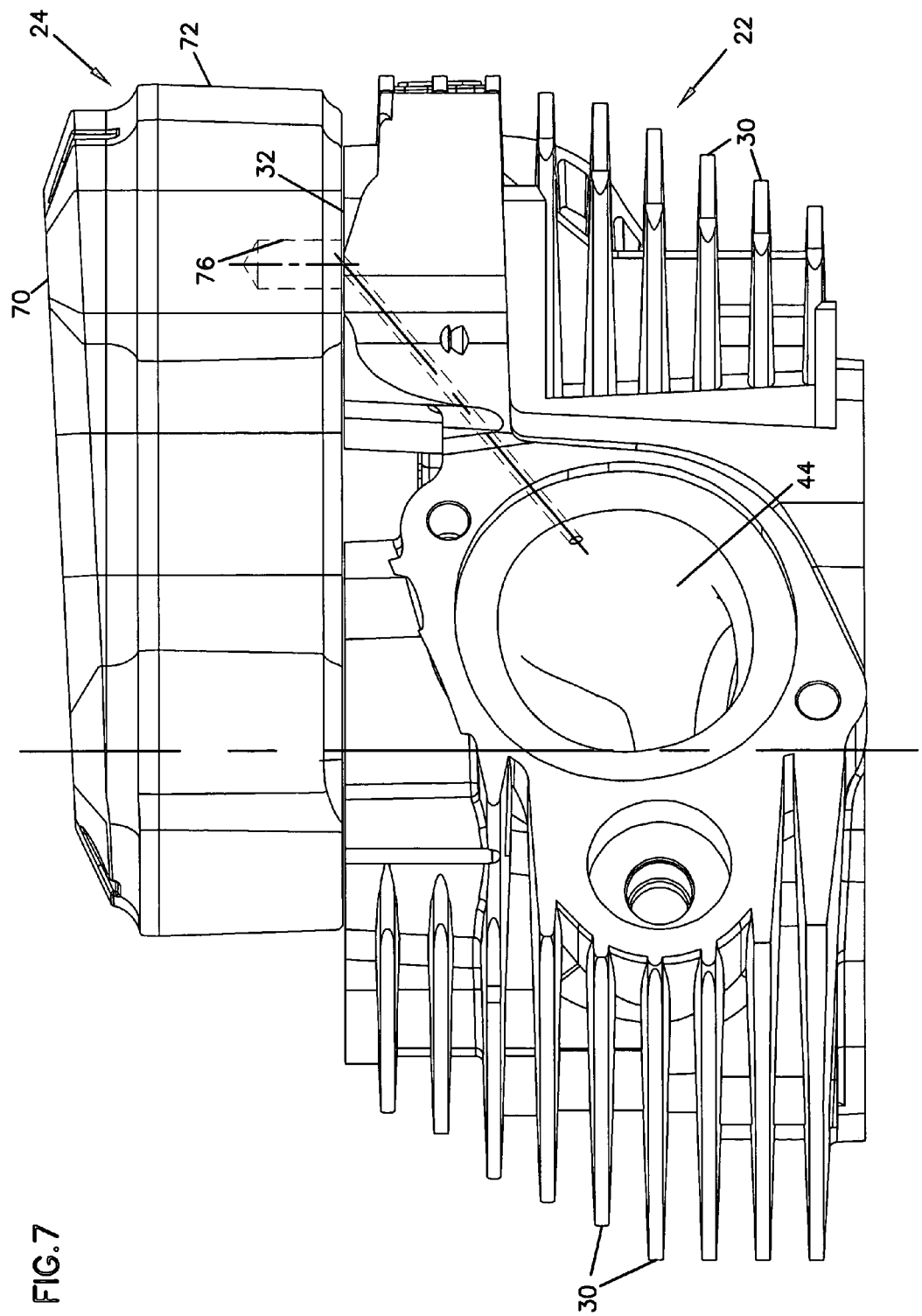
FIG. 7 is a sectional view of a second embodiment of a cylinder head and rocker box for the engine shown in FIG. 6.
Figure 8:
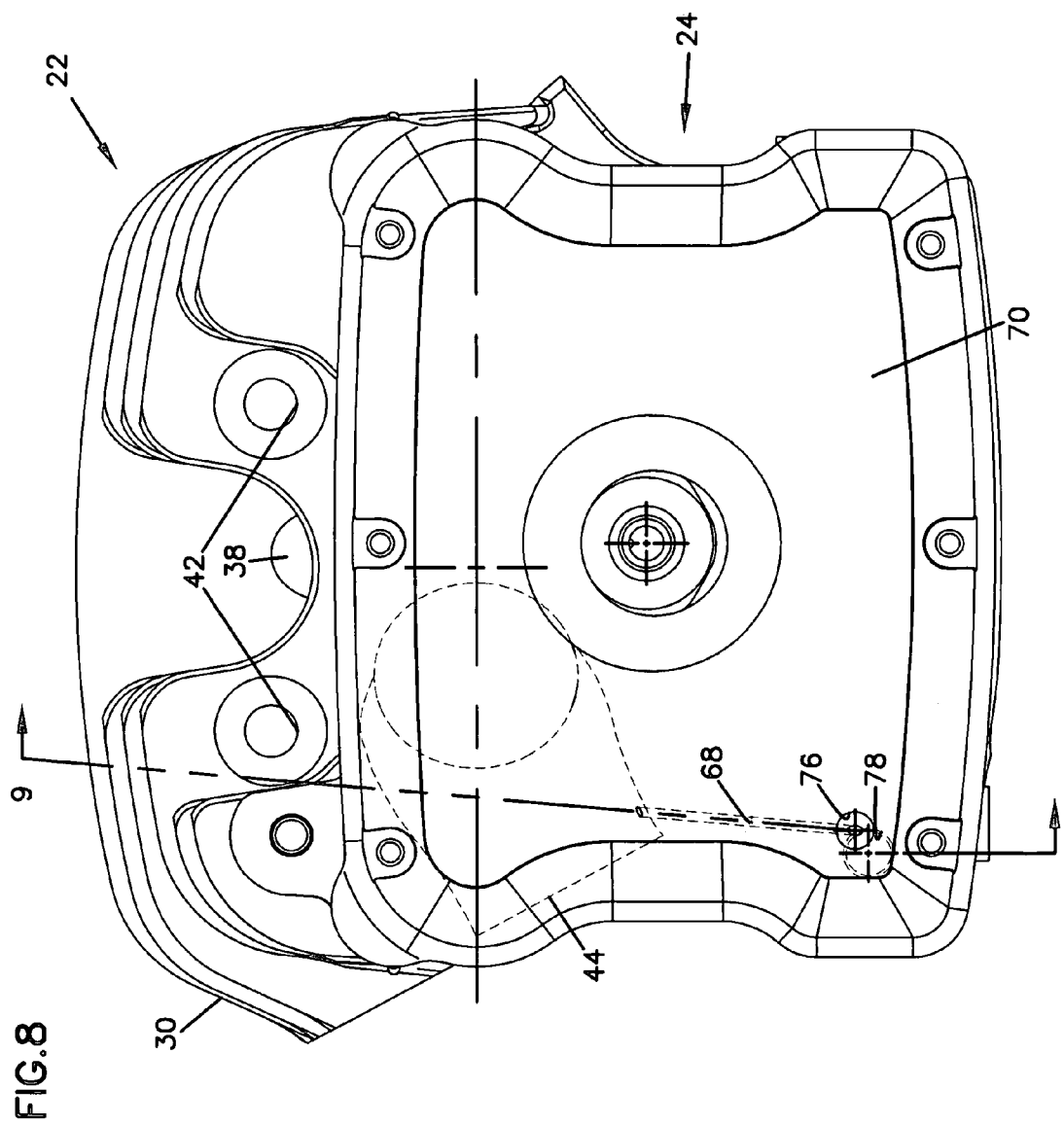
FIG. 8 is top plan view of the rocker box and cylinder head shown in FIG. 7.
Figure 9:
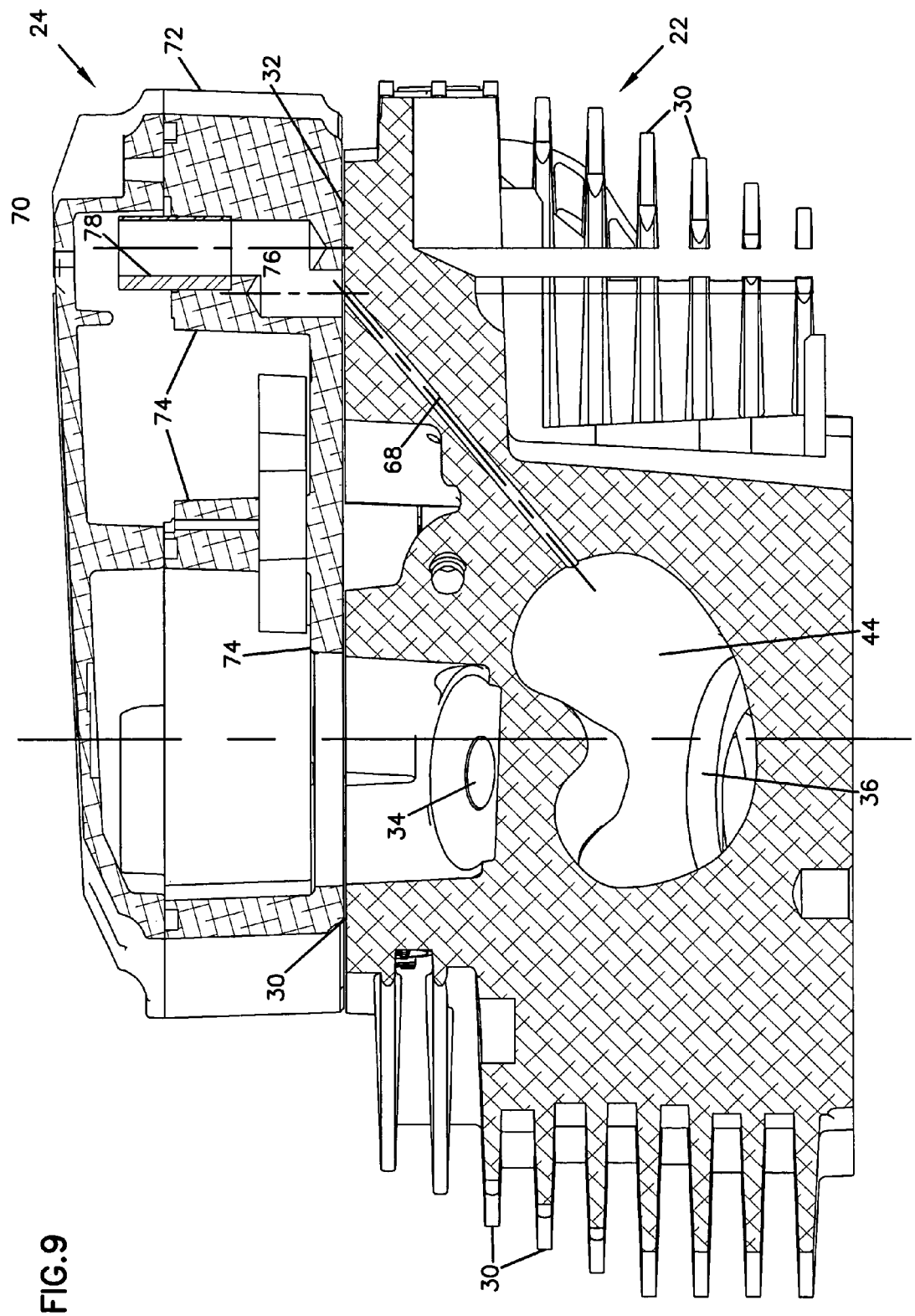
FIG. 9 is a sectional view of the rocker box and cylinder head taken along line 9—9 of FIG. 8.

Referring now to the drawings, and in particular to FIGS. 1 and 6, there is shown a two cylinder V-type motorcycle engine, generally designated 10. Such engines 10 are well known in the art and have been successfully manufactured and used for decades. The engine mounts to a frame 12 and couples to a drive train, an exhaust system and an intake system. The engine 10 typically includes a crankcase portion 14, a sump holding lubrication oil, one or more camshafts and a drive shaft. Two cylinder assemblies mount onto the crankcase in a V-type configuration. The cylinder assemblies each include a cylinder 18, a cylinder head such as cylinder head 20, and a rocker box assembly 24. Push rods 16 extend from the crankcase assembly 14 up through the cylinder head 20 to the rocker box assembly 24. A piston moves in an up and down reciprocating motion during the combustion cycle within the cylinders 16 and to the combustion chamber formed by the bottom of the cylinder head 20. Combustion occurs utilizing a valve assembly, a spark plug and a carburetor or fuel injector system.

Referring now to FIGS. 1–5, there is shown a first embodiment of the cylinder head 20. It will be appreciated to those skilled in the art that cylinder head 20 is typically modified depending on whether it is the front or rear cylinder head, however these changes in configuration are to accommodate other equipment and do not substantially affect the overall features of the cylinder head. Moreover, a second embodiment of a cylinder head, generally designated 22 and shown in FIGS. 7–10, may be interchangeable with the first embodiment of a cylinder head 20 shown in FIGS. 1–5 for many applications. Mounting of the cylinder heads and other engine parts may dictate the use of one or the other of the cylinder heads in certain applications or may require mounting of one embodiment of cylinder head on the front with the other embodiment on the rear cylinder assembly of the engine 10. The cylinder heads 20 and 22 are substantially identical except for the duct systems, whose function will be described below.

The cylinder heads 20 and 22 generally include cooling fins 30 extending outward to provide increased surface area and air cooling to the cylinder heads 20 and 22. An upper mounting surface 32 receives the rocker box assembly 24, as shown in FIGS. 3 and 7–10. The rocker box assembly 24 is typically bolted onto the rocker box mounting surface 32 in a conventional manner. The cylinder heads 20 and 22 define a combustion chamber 36 shown most clearly in FIG. 9 aligning with the top of the bore of the associated cylinder. Valves extend into the combustion chamber 36 and openings 34 are provided for receiving valve springs. An intake port 44 opens to the combustion chamber 36. The cylinder heads 20 and 22 also define openings 40 for the push rods 16 to extend through, as shown most clearly in FIG. 4. A threaded opening 38 receives a spark plug for providing spark to the combustion chamber 36. The cylinder heads 20 and 22 are mounted to the associated cylinder in a conventional manner with bolts extending through cylinder head mounting holes 42.

As shown in FIG. 1, the cylinder heads 20 (and 22) include an intake system including an intake manifold 46 that mounts to the side of the cylinder head and aligns with the intake port of the intake system.

It is noted that directional terms such as top, bottom, side, vertical and horizontal are used herein for reference only for the embodiments shown with the surface of the cylinder head that mounts to the rocker box being horizontal. It is further noted that in use, the various structure may not be so oriented.

Referring to FIGS. 3 and 7–10, the rocker box assembly 24 receives the upper ends of the push rods 16 and also supports rocker arms (not shown for clarity). The rocker box assembly 24 mounts to the upper rocker box mounting surface 32 of the cylinder heads 20 and 22 and typically has a sealing gasket there between. The rocker box includes a housing 72 receiving a cover 70. Rocker arm supports 74 are mounted within the rocker box assembly 24. The housing 72 defines an opening including a lower vertical bore portion 76 and an upper vertical bore portion 78 extending downward to the upper surface 32 to provide for removal of blow-by gases through the rocker box assembly 24, as explained hereinafter.

Figure 3:
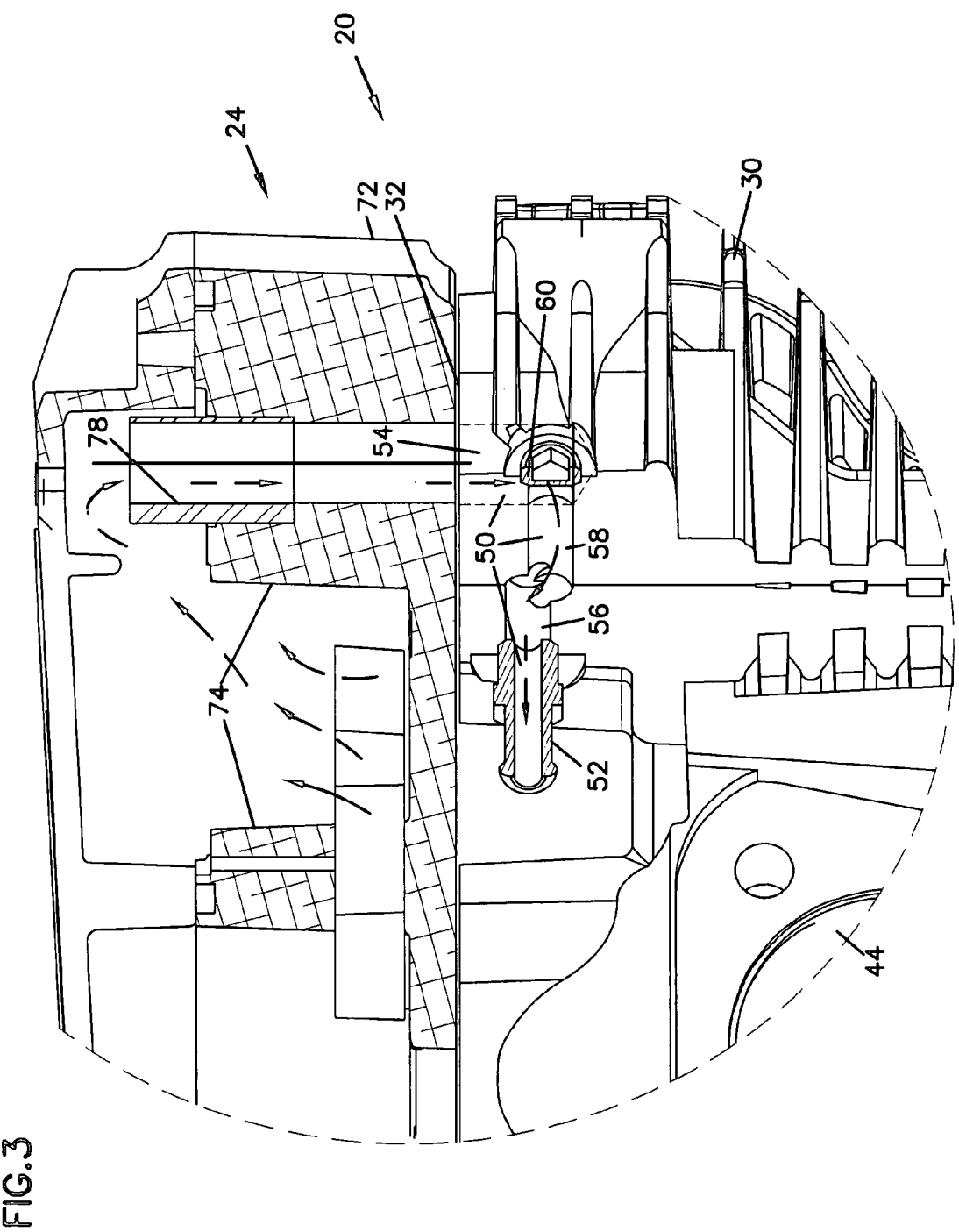
FIG. 3 is partial sectional detail view of the cylinder head shown in FIG. 2 mounted to a rocker box according to the principles of the present invention.
Figure 4:
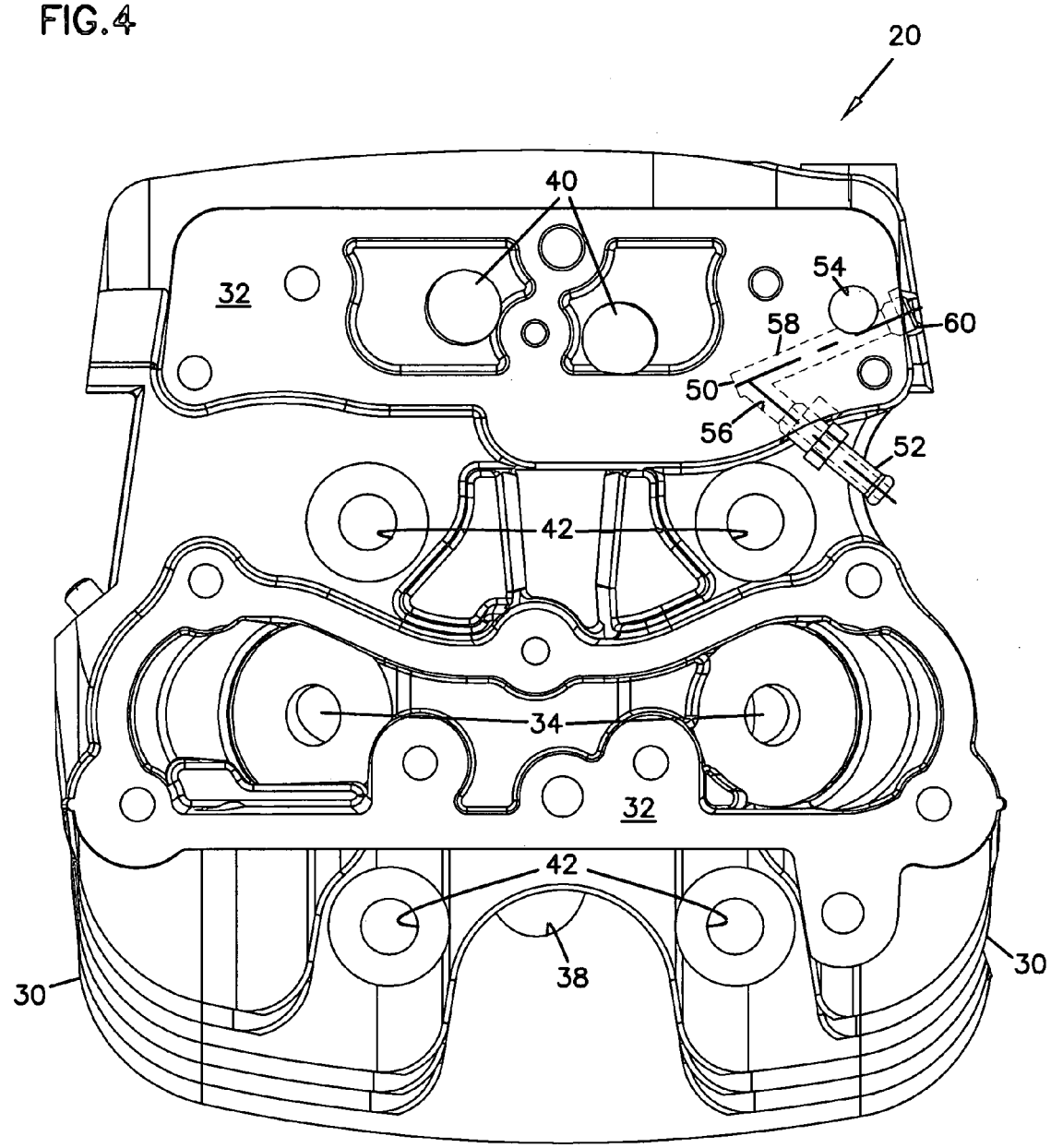
FIG. 4 is a top plan view of the cylinder head shown in FIG. 2.
Figure 5:
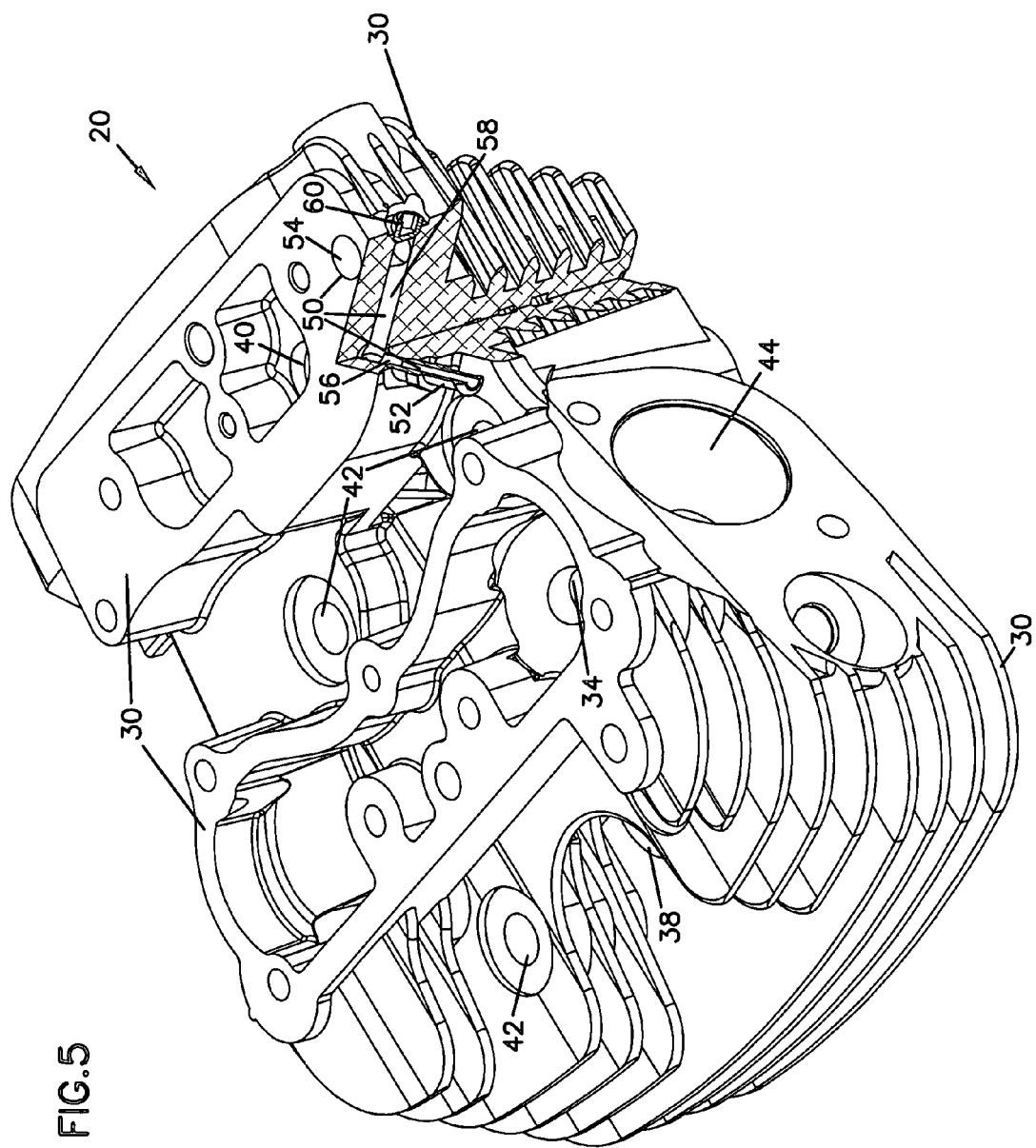
FIG. 5 is a perspective view of the cylinder head shown in FIG. 2 with portions removed to show a blow-by duct according to the principles of the present invention.

The present invention provides for improvements over breather channels of the prior art. According to the present invention, such unwanted blow-by is positively removed rather than just allowing normal passive "breathing" to occur. Positive suction due to pressure differential from engine operation draws the unwanted oil and fuel laden gases and vents them through ducts to a more desirable location. The cylinder head 20 includes a duct system 50 leading from the vertical bore 76 formed in the rocker box 24 to a fitting 52. The fitting 52 extends from the side of the cylinder head 20. The fitting 52 receives a blow-by relief line 62 extending to a fitting 64 on the intake manifold 46, as shown in FIG. 6. As shown in FIGS. 3–5, the duct system 50 includes a first vertical portion 54 extending to the upper rocker box mounting surface 32. A second substantially horizontal duct portion 56 extends to the fitting 52 and may include a threaded portion to receive the fitting 52. A third portion 58 also extends substantially horizontally and intersects and connects the vertical portion 54 to the second portion 56 extending to the fitting 52. The outer end of the third portion 58 extends to the side of the cylinder head 20 and is sealed with a plug 60 at its outer unused end in a conventional manner. The series of connected bores 54, 56 and 58 provides for routing of blow-by from the rocker box 24 through the cylinder head 20 to the intake system at the intake manifold 46. Three straight bores 54, 56 and 58 are formed in the cylinder head 20 in an easy and inexpensive manner and overcome the manufacturing difficulties associated with forming channels in the surface of the cylinder head, and further challenges associated with trying to form channels with an arc.

The blow-by gases are drawn to the intake manifold 46 shown in FIG. 1 from the rocker box 24. As shown in FIG. 3, gases flow through the vertical bore 78 and 76 aligned with the vertical portion 54 of the duct 50. The blow-by gases enter the horizontal portion 58 of the duct system 50 and then flow out through the horizontal portion 56 and the fitting 52. As shown in FIG. 1, gases flow from the fitting 52 through the blow-by line 62 extending to a fitting 64 on the intake manifold 46.

Referring to FIGS. 7–10, the cylinder head 22 also includes a duct system, designated 68, to remove blow-by gases. The duct system 68 has a single straight bore portion that extends from the upper surface 32 of the cylinder head 22 to the intake port 44. As stated above, as there is positive suction to draw the gases through the duct 68, a smaller diameter duct is needed, rather than the larger channels associated with the prior art breathing methods. The duct 68 is positioned at an oblique angle relative to the upper surface 32 to lead directly to the intake port 44 for simple manufacture.

Figure 10:
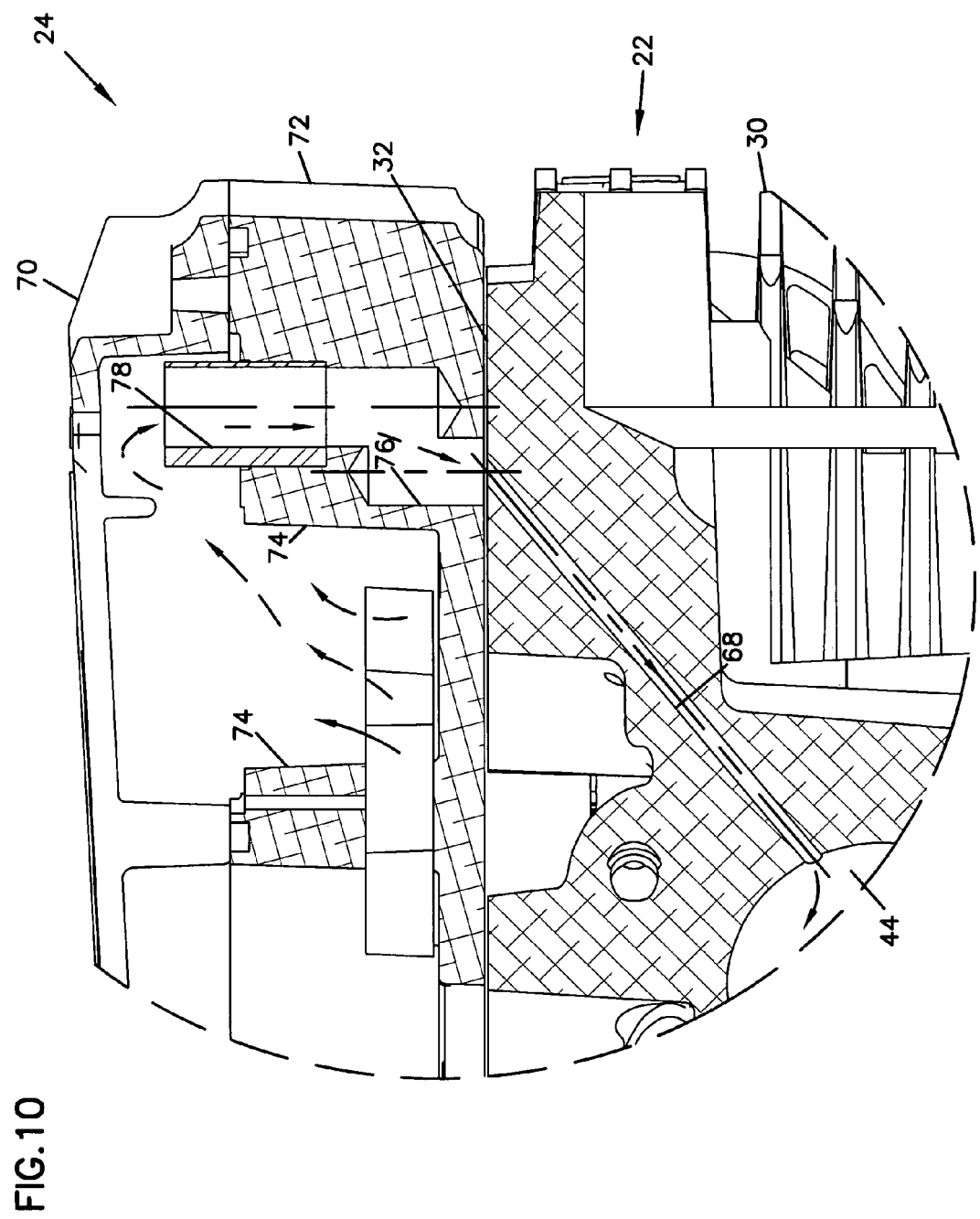
FIG. 10 is a partial sectional detail view of the cylinder head shown in FIG. 7 mounted to a rocker box according to the principles of the present invention.

As shown in FIG. 10, flow of the blow-by gases with the cylinder head 22 and duct system 68 removes the gases from the rocker box 24 and vents them to the intake port 44. Gases are drawn through the rocker box 24 into the upper end of the vertical bore 78 and pass down through the intersecting vertical bore 76. The vertical bore 76 is aligned with the upper end of the duct 68 so that blow-by gas flows directly through the duct 68 downward to the intake port 44. The arrangement of the duct system 68 provides for simple manufacture with a single straight drilling operation being conducted and no other modification of the cylinder head 22 being required.

Either of the embodiments of the cylinder heads 20 or 22 may be utilized depending upon the spatial mounting requirements and limitations for the heads and the type of application. Moreover, it can be appreciated that the cylinder heads 20 and 22 may be mixed and matched so that one of the heads 20 or 22 may be utilized for the front cylinder assembly while the other of the cylinder heads 20 or 22 could be utilized on the rear cylinder assembly should mounting arrangements and the application require such an arrangement. Both of the cylinder heads 20 and 22 are easily interchangeable with the same sets of cylinders 18 and both are also utilized with the same rocker box 24. In addition, it is readily understood by those skilled in the art that the same kinds of duct arrangements 50 and 68 may be utilized with other types of cylinder heads for other engine applications and uses without departing from the principles of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A cylinder head, comprising:
   a cylinder head body having
      an engagement surface for receiving a rocker box; and
      a side portion that defines an intake port,
   wherein the cylinder head body defines a substantially straight duct from the engagement surface to the intake port, and
   wherein the duct extends at an oblique angle relative to the engagement surface.

2. A cylinder head according to claim 1, wherein the duct is entirely internal to the cylinder head.

3. A cylinder head according to claim 1, wherein the cylinder head is under vacuum to draw gases through the duct to the intake port.

4. A cylinder head according to claim 1, further comprising a vacuum source drawing gases through the duct to the intake port.

5. An internal combustion engine, comprising:
   a crankcase;
   a cylinder mounted to the crankcase;
   a cylinder head mounted to the cylinder, the cylinder head including
      an engagement surface; and
      a side portion that defines an intake port;
   a rocker box mounted to the engagement surface; and
   an intake system coupled to the intake port,
   wherein the cylinder head defines a substantially straight duct at an oblique angle relative to the engagement surface, and
   wherein the duct extends from the engagement surface to the intake port.

6. An engine according to claim 5, wherein the duct has a first portion extending to the rocker box mounting surface, a second portion extending to a line leading to the intake system, and a third portion connecting the first portion and the second portion.

7. An engine according to claim 6, wherein the intake system comprises an intake manifold mounted to a side of the cylinder head, and wherein the line leads to the intake manifold.

8. An engine according to claim 5, wherein the duct is under a pressure differential to draw gases through the duct to the intake system.

9. An engine according to claim 5, further comprising a vacuum source in fluid communication with the intake system drawing gases through the duct to the intake system.

10. An engine according to claim 5, wherein the duct is entirely internal to the cylinder head.

* * * * *